(12) United States Patent
Edwards et al.

(10) Patent No.: US 6,264,436 B1
(45) Date of Patent: *Jul. 24, 2001

(54) MULTIFUNCTION VALVE

(75) Inventors: Phillip M. Edwards, Cherry Hill, NJ (US); James K. Sutherland, Harleysville; Robert J. Meehan, Roslyn, both of PA (US)

(73) Assignee: Milton Roy Company, Ivyland, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,692

(22) Filed: May 11, 1999

(51) Int. Cl.[7] .................................................. F04B 9/12
(52) U.S. Cl. .................................................. 417/388
(58) Field of Search .................................. 417/388, 385, 417/383, 379, 375, 321; 251/57

(56) References Cited

U.S. PATENT DOCUMENTS

| 2,578,746 | 12/1951 | Scherger et al. ............. 103/44 |
| 3,612,727 | 10/1971 | Drake et al. ................ 417/388 |
| 4,116,004 | 9/1978 | Geary ....................... 60/543 |
| 4,184,809 | 1/1980 | Kelley ...................... 417/360 |
| 4,188,170 | 2/1980 | Ito .......................... 417/387 |
| 4,328,827 | 5/1982 | Enjolras .................... 137/512.2 |
| 4,474,540 | * 10/1984 | Bonastia et al. ............. 417/63 |
| 4,806,082 | * 2/1989 | Schnek ...................... 417/388 |
| 4,951,701 | 8/1990 | Boehmer .................... 137/199 |
| 5,372,484 | * 12/1994 | Briggs et al. ............... 417/310 |
| 5,647,733 | 7/1997 | Augustyn et al. ............ 417/360 |
| 5,860,793 | * 1/1999 | Muscarella et al. .......... 417/388 |

FOREIGN PATENT DOCUMENTS

| 4036696 | 10/1991 | (DE) . |
| 641 935 B1 | 6/1994 | (EP) ........................ F04B/43/067 |
| 641 936 B1 | 3/1995 | (EP) ........................ F04B/43/067 |
| 2775750 | 10/1999 | (FR) . |
| 08334090 | 12/1996 | (JP) . |
| 09079402 | 3/1997 | (JP) . |
| 720 188 | 3/1980 | (SU) ........................ F04B/45/04 |

OTHER PUBLICATIONS

Milton Roy Metering Pump Technology—Bulletin 210 (dated Jul. 1998).
Pulsar brochure—Time and Again Pulsafeeder Sets the Standard—(dated Nov. 1995).

* cited by examiner

Primary Examiner—Teresa Walberg
Assistant Examiner—Daniel Robinson

(57) ABSTRACT

A multifunction hydraulic valving apparatus includes a relief valve, a gas purge valve and a bleed valve disposed in a single bore.

21 Claims, 4 Drawing Sheets

MULTIFUNCTION VALVE

TECHNICAL FIELD

The present invention relates generally to valving apparatus, and more particularly, to a multifunction valve for fluids.

BACKGROUND ART

Valves are frequently used in fluid handling devices, such as metering pumps. In such an environment, a relief valve is often provided to provide a fluid pressure relief function when fluid pressures exceed a maximum value. Further, an automatic air bleed valve separate from the relief valve is also typically provided to allow continuous bleed off of small amounts of air liberated from the working fluid which would otherwise accumulate and be trapped in the working chamber of the pump. Still further, a purge valve may be included to permit rapid purging of relatively large amounts of air from the working chamber.

In at least one type of pump design as disclosed in U.S. Pat. No. 5,860,793, the purge valve function is incorporated into the automatic air bleed valve. Specifically, the automatic air bleed valve comprises a ball disposed in a valve body and movable between a lower valve seat and an upper valve seat. A rod is disposed on the top of the ball and is movable therewith. During each discharge stroke of the pump, the ball and rod move upwardly away from the lower seat toward the upper seat. During travel of the ball, a small amount of air and working fluid escape out of the working chamber. Once the ball moves into engagement with the upper seat, further escape of air and working fluid is prevented. On the subsequent suction stroke, the ball moves downwardly back into sealing engagement with the lower seat. The purge function is effected by depressing a push-button on the valve, thereby limiting the upward movement of the rod and preventing the ball from reaching the upper seat during the upward travel thereof. Because the ball is not sealed, a larger quantity of air and working fluid can escape from the working chamber. While a purge function can be undertaken in this fashion, the amounts of air that be purged are limited owing to the small clearances between the ball and the valve body. In addition, the pump disclosed in the '793 patent requires the relief valve in addition to the valve that accomplishes the automatic bleed and purge functions.

SUMMARY OF THE INVENTION

In accordance with one aspect of the present invention, a multifunction hydraulic valving apparatus includes a relief valve, a gas purge valve and a bleed valve. The relief valve, the gas purge valve and the bleed valve are disposed in a single bore. The apparatus is preferably, although not necessarily, adapted for use in fluid communication with a pump.

Preferably, the bleed valve comprises a ball disposed in a valve chamber and is movable into and out of engagement with a valve seat during suction and discharge strokes of the pump. Also preferably, the purge valve comprises a movable valve element which is manually displaceable away from a sealing position in engagement with a valve seat. Still further in accordance with the preferred embodiment, the relief valve comprises a spring-loaded poppet which is movable in response to an elevated fluid pressure condition away from a sealing surface.

The relief valve, the gas purge valve and the bleed valve may have coaxial sealing surfaces and the bleed valve may be disposed within the gas purge valve. In addition, the gas purge valve may be disposed within the relief valve. Still further, the purge valve may comprise a movable valve element and the bleed valve may include a ball movable within a valve chamber disposed in the movable valve element.

According to a highly preferred embodiment, the relief valve includes a spring-loaded poppet which is movable in response to an elevated fluid pressure condition, the purge valve comprises a movable valve element disposed in the poppet and the bleed valve includes a ball movable within a valve chamber disposed in the movable valve element.

In accordance with another aspect of the present invention, a multifunction hydraulic valving apparatus includes a relief valve, a gas purge valve and a bleed valve all disposed in a single bore. The relief valve, the gas purge valve and the bleed valve have a common center axis and the bleed valve is disposed radially inside the gas purge valve and the gas purge valve is disposed radially inside the relief valve.

In accordance with yet another aspect of the present invention, hydraulic apparatus includes a fluid pump and multifunction valving apparatus in fluid communication with the fluid pump and disposed in a single bore in the fluid pump. The valving apparatus includes a relief valve, a gas purge valve and a bleed valve wherein the relief valve, the gas purge valve and the bleed valve have coaxial sealing surfaces. The bleed valve is disposed radially inside the gas purge valve and the gas purge valve is disposed radially inside the relief valve and the relief valve includes a spring-loaded poppet which is movable in response to an elevated fluid pressure condition. The gas purge valve comprises a movable valve element disposed in the poppet and the bleed valve includes a ball movable within a valve chamber disposed in the valve element.

Other aspects and advantages of the present invention will become apparent upon consideration of the following drawings and detailed description.

DESCRIPTION OF THE PREFERRED EMBODIMENT

Figure 1:
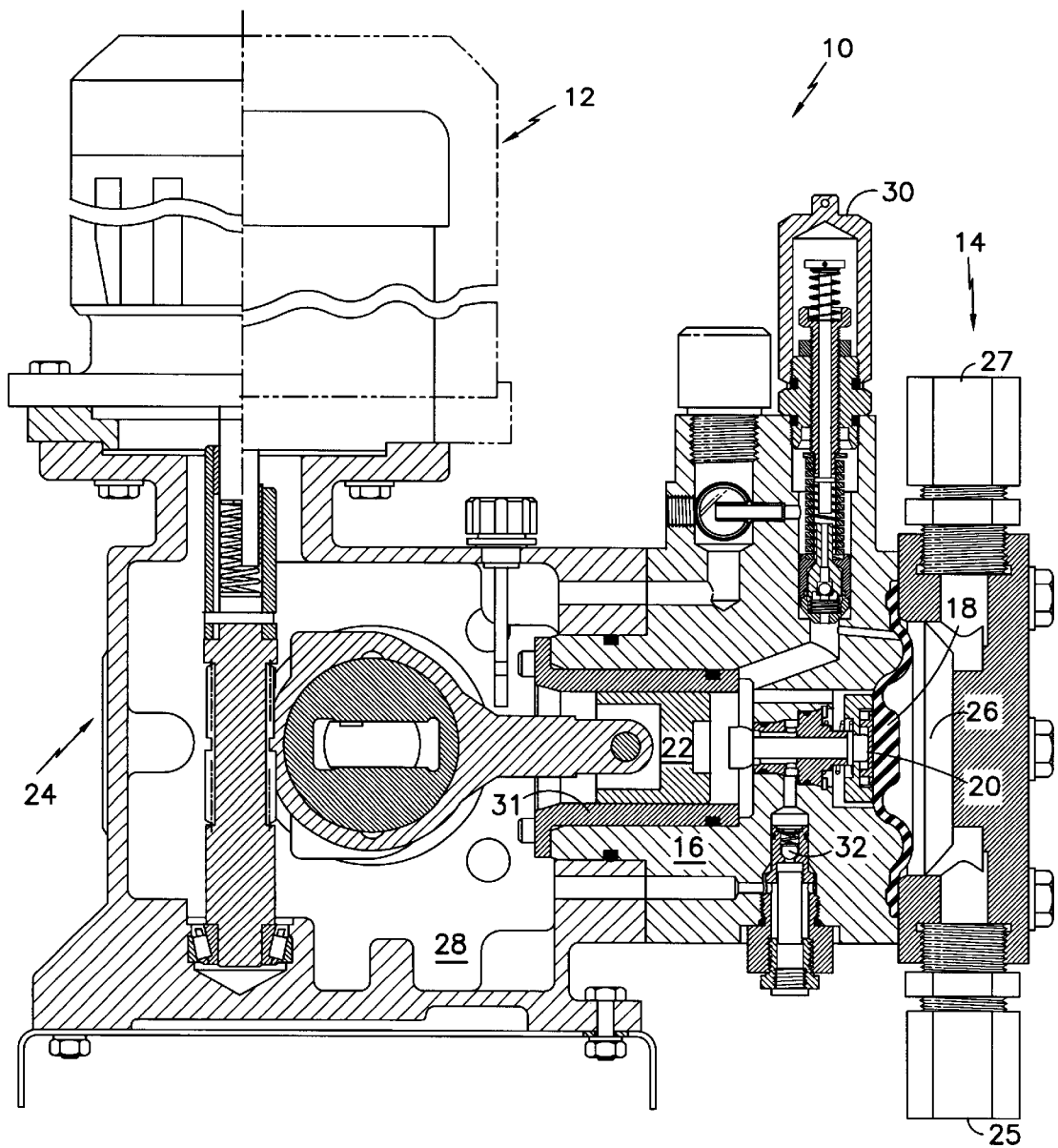
FIG. 1 comprises a cross-sectional view of a metering pump incorporating the present invention.

Referring now to FIG. 1, a metering pump 10 is driven by a motor 12 and delivers a controlled quantity of process fluid into a conduit or receptacle (not shown). The metering pump 10 may be of the hydraulically-actuated type, the mechanically-actuated type or the electromagnetically-actuated type.

Figure 2:
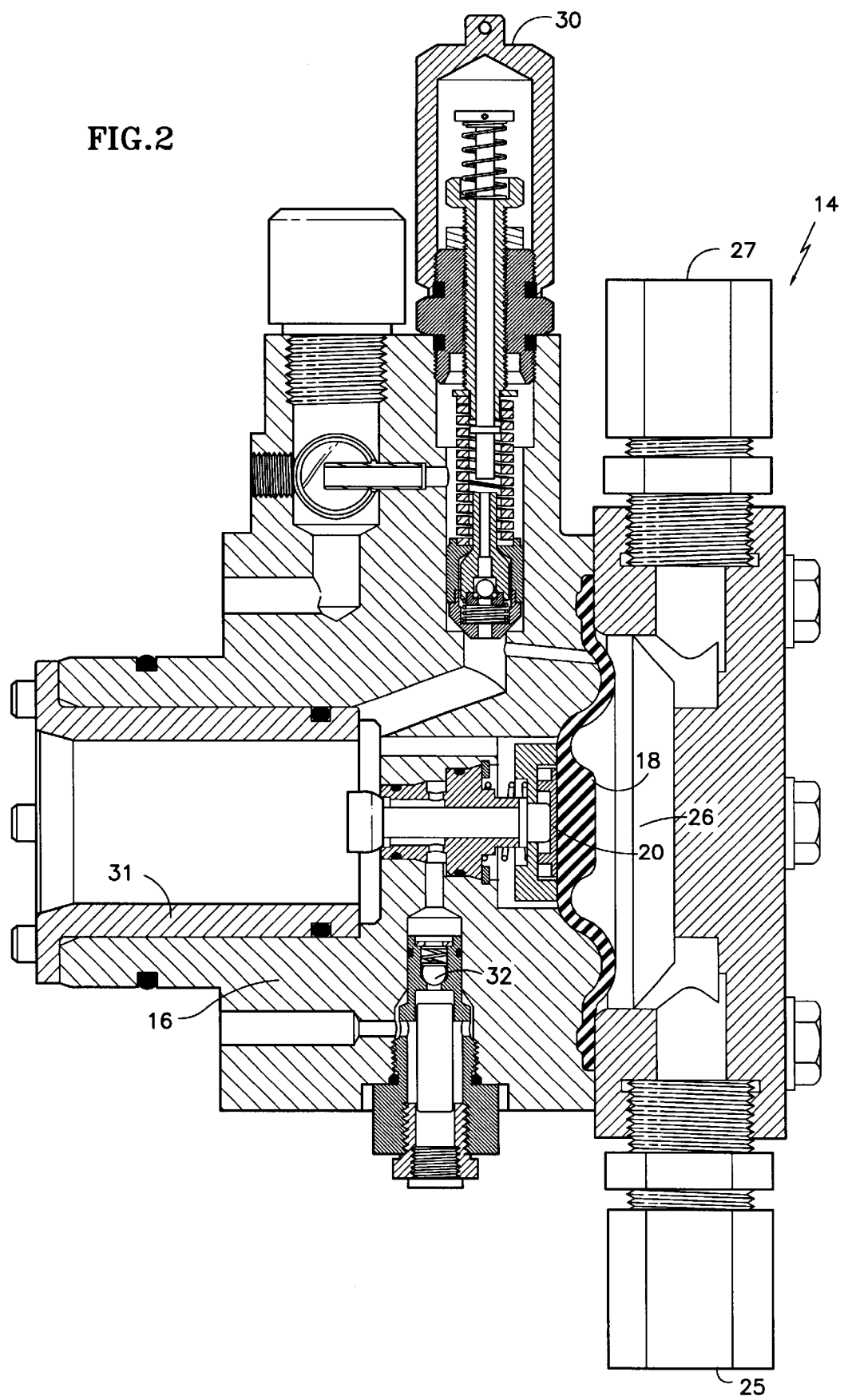
FIG. 2 comprises a fragmentary, full sectional view of the metering pump of FIG. 1.

As seen in FIG. 2, the pump 10 is preferably of the hydraulically-actuated type and includes a liquid end 14 which is separated from a displacement chamber 16 by a diaphragm 18 and a mechanically actuated refill valve 20. A piston or plunger 22 is disposed in the displacement chamber 16 and is reciprocated therein by a drive assembly 24. In operation, reciprocation of the plunger 22 in the displacement chamber 16 results in reciprocating movement of the diaphragm 18 during suction and discharge strokes of the pump 10. During each suction stroke, process fluid is drawn through one or more check valves 27 into a diaphragm head chamber 26. During each discharge stroke, process fluid is discharged from the diaphragm head chamber 26 through one or more additional check valves 25. During normal operation, a small amount of working fluid (e.g., oil) escapes from the displacement chamber 16 into a reservoir 28 in the drive assembly 24 through a multifunction valve 30 and through a clearance between the plunger 22 and a sleeve 31. Eventually, the quantity of working fluid in the displacement chamber 16 is reduced to an extent which causes the diaphragm to contact and open the valve 20 during one or more suction strokes of the pump. Opening of the valve 20 causes working fluid to flow from the reservoir 28 through a spring-loaded check valve 32 and the valve 20 into the displacement chamber 16. Eventually, sufficient make-up working fluid is supplied to the displacement chamber 16 to prevent further actuation of the valve 20 during subsequent suction strokes. In this fashion, the amount of working fluid in the displacement chamber 16 is maintained at a level sufficient to ensure continued proper operation of the pump 10.

Figure 3:
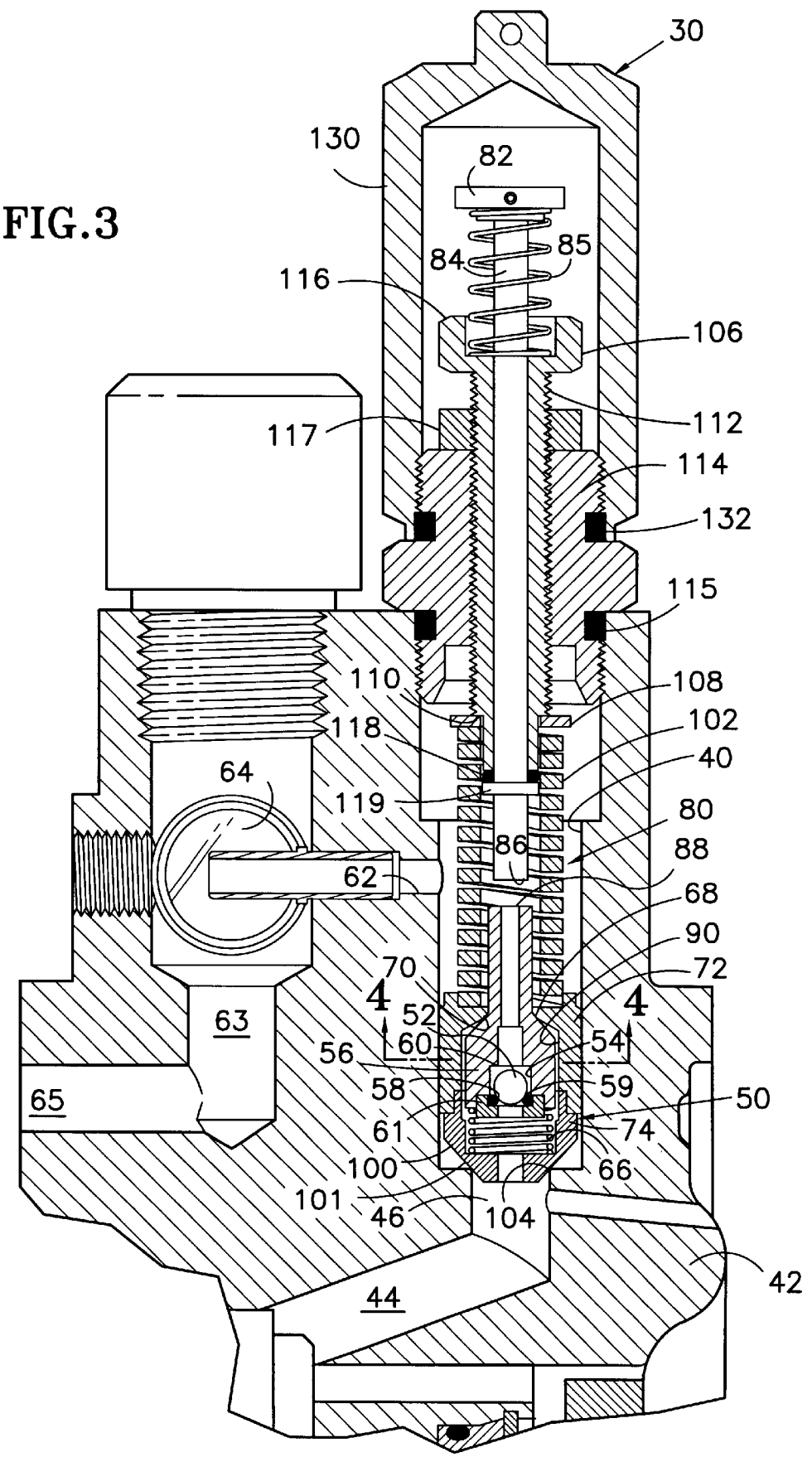
FIG. 3 comprises an enlarged, fragmentary, sectional view illustrating the multifunction valve of FIG. 2 in greater detail.

Referring now to FIG. 3, the multifunction valve 30 accomplishes an automatic air bleed function, a gas purge function and a relief function utilizing components disposed in a bore 40 formed in a top portion of a housing 42 of the displacement chamber 16. Because the multifunction valve 30 is located above the displacement chamber 16, any gas that might come out of solution from the working fluid migrates to the base of the valve 30 through passages 44 and 46.

AIR BLEED VALVE DESIGN

The air bleed function is accomplished by an air bleed valve 50, which includes a first valve element in the form of a ball 52. The ball 52 is movable in a valve chamber or recess 54 formed in a second valve element 56. The valve chamber 54 is defined in part by first and second sealing surfaces or valve seats 58, 60, respectively. The first valve seat 58 is carried by an O-ring seal 59 which is retained by a retainer 61 held in place by an interference or friction fit inside the second valve element 56.

During operation of the pump 10, the ball 52 travels back and forth between the first and second valve seats 58, 60 and allows air and working fluid to escape from the displacement chamber 16. Specifically, during each discharge stroke of the pump 10, the pressure in the displacement chamber 16 rises, causing the pressure on the lower end of the ball 52 also to rise. The pressure on the upper end of the ball 52 remains at substantially atmospheric pressure and hence a pressure differential is created across the ball 52 which, in turn, causes the ball 52 to move toward the second valve seat 60. During this travel of the ball 52, a small amount of working fluid (approximately one drop per stroke) escapes from the displacement chamber 16 around the ball 52 into the bore 40. Escaping with this working fluid is any gas which may have accumulated in the passage 46. The level of working fluid in the bore 40 rises during subsequent strokes until such level reaches an exit port 62. Thereafter, the working fluid flows in a drop-by-drop fashion through passages 63 and 65 to the reservoir 28. A sight glass 64 is provided to allow an operator of the pump to visually observe this escape of working fluid, thus providing assurance of proper pump operation.

During each discharge stroke, once the ball 52 has moved into sealing engagement with the second valve seat 60, further escape of working fluid and gas past the ball 52 is prevented. In addition, the second valve element 56 is biased by a spring 66 upwardly to cause a conical portion 68 thereof to sealingly engage a third sealing surface or valve seat 70 carried by an upper portion 72 of a poppet body 74. This sealing engagement prevents further escape of working fluid and gas from the displacement chamber 16.

As the plunger 22 begins a suction stroke, a reverse pressure differential is created across the ball 52, in turn causing the ball 52 to be quickly pulled downwardly into engagement with the first valve seat 58 and preventing working fluid from being drawn back into the displacement chamber 16.

PURGE VALVE DESIGN

In the event that a blockage occurs in the pump supply line, a vacuum pressure condition is created in the hydraulic working fluid during the suction stroke. This vacuum condition allows for a relatively large volume of gas to be liberated from solution. This gas pocket then accumulates under the valve 30. When the supply line is reopened, the flow rate of the pump 10 is severely compromised by the presence of this gas volume. The performance of the pump 10 could be slowly restored through the gradual release of gas through the air bleed valve 50 described above. However, the operator of the pump typically prefers to quickly restore the pump back to normal operation. Thus, a purge valve 80 allows for a quick release(purge) of a large volume of accumulated gas from the hydraulic system.

Figure 4:
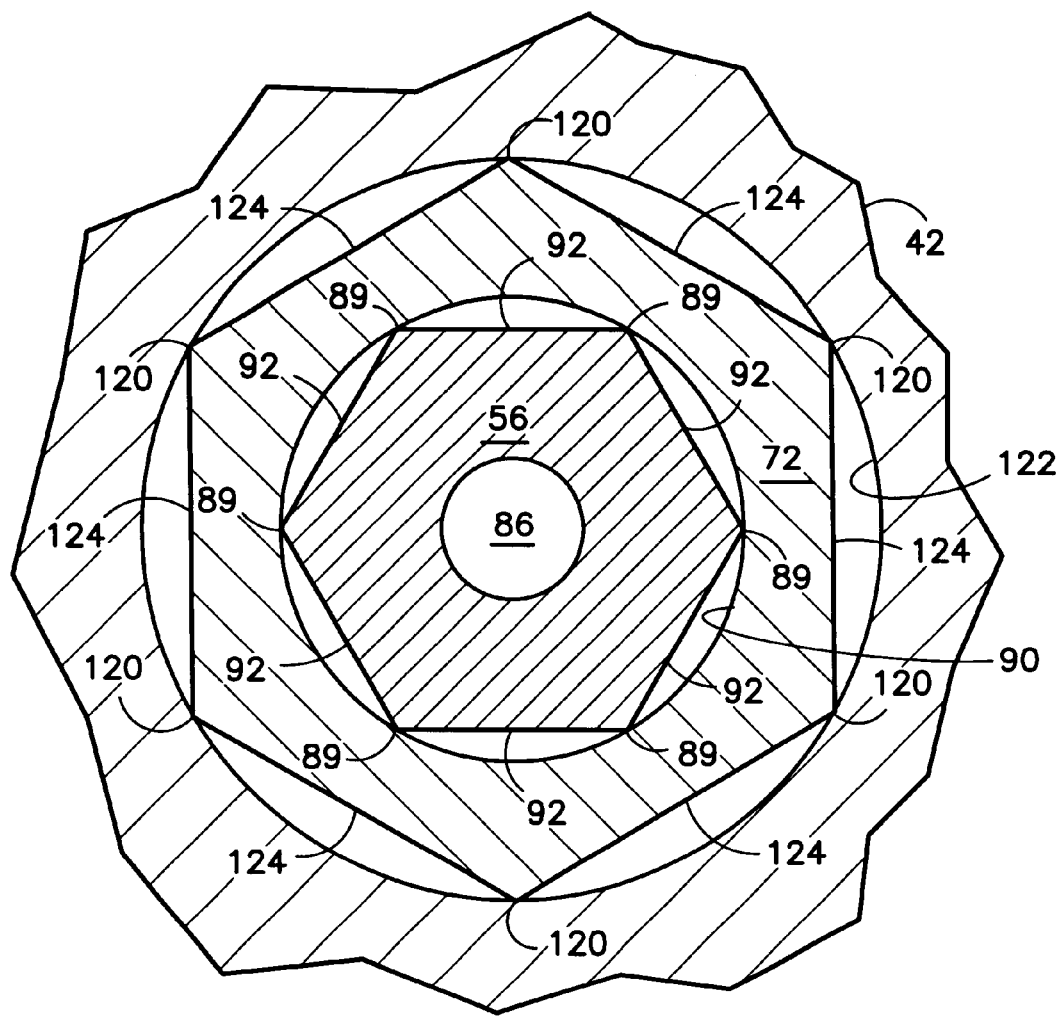
FIG. 4 comprises a sectional view of the multifunction valve taken generally along the lines 4—4 of FIG. 3.

When a button 82 on top of a manually displaceable actuator in the form of a stem 84 is depressed against an upward force exerted by a spring 85, a bottom surface 86 of the stem 84 contacts a top surface 88 of the second valve element 56. When the force applied to the button 82 and stem 84 exceeds the upward force exerted by the spring 66, the second valve element 56 is displaced downwardly such that the conical portion 68 no longer is in sealing engagement with the third valve seat 70 carried by the upper portion 72 of the poppet body 74. As seen in FIG. 4, the second valve element 56 may be machined from hexagonal bar. A sliding fit exists between points 89 of the hexagonal bar and an inner circular cylindrical surface 90 of the upper portion 72 of the poppet body 74. Flat surfaces 92 of the hexagonal bar allow for passage of gas and working fluid. As the contact is removed between the conical portion 68 and the third valve seat 70, working fluid then escapes up along the flat surfaces 92 of the hexagonal bar and out of an opening between the second valve element 56 and the third valve seat 70. The clearances are designed to permit a large release of working fluid and gas. Thus, the gas is quickly purged to restore the pump to normal flow rates and operation.

If desired, the second valve element 56 may be fabricated from circular cylindrical bar having an outer diameter less than the diameter of the inner circular cylindrical surface 90 of the upper portion 72 of the poppet body 74 such that an annular clearance for the passage of gas and working fluid is provided.

RELIEF VALVE DESIGN

The poppet body 74 includes the upper portion 72 described above and a lower portion 100 joined together in any suitable fashion, such as by an interference fit. A conical surface 101 of the lower portion 100 is urged by a spring 102 into contact with a fourth sealing surface or valve seat 104 located just above the passage 46. The force exerted by the spring 102 is controlled by the amount of spring compression, which is determined by the location of an adjustment stem 106. The spring 102 is captured between the upper portion 72 of the poppet body 74 and a washer 108 which abuts a shoulder 110 of the adjustment stem 106. A threaded portion 112 of the adjustment stem 106 is threaded into a cap 114 and the latter is threaded into the bore 40. An O-ring 115 seals the bore 40. The position of the washer 108 is adjusted by turning a top hexagonally-shaped portion 116 of the adjustment stem 106. Clockwise rotation of the adjustment stem 106 (when looking down on the valve 30) causes downward movement of the washer 108 which increases the compression on the spring 102 and, in turn, the spring force. Counterclockwise rotation of the adjustment stem 106 conversely decreases the compression of the spring 102 and the applied spring force. A lock nut 117 is tightened down on the cap 114 to maintain the position of the adjustment stem 106. An O-ring seal 118 abuts a shoulder 119 and prevents working fluid from entering an annular space between the stem 84 and the adjustment stem 106.

Relief of pressure in the displacement chamber 16 occurs when the fluid pressure on the bottom of the poppet body 74 is high enough to overcome the spring force exerted on the top of the poppet body 74. As seen in FIG. 4, the upper portion 72 of the poppet body 74 is machined from hexagonal bar and includes points 120 that have a sliding fit within a circular cylindrical surface 122 defining the bore 40. Once the fluid pressure overcomes the force of the spring 102 and lifts the conical surface 101 out of contact with the fourth valve seat 104, working fluid then escapes through clearances between flat surfaces 124 of the upper portion 72 and the surface 122. Released oil then flows out of the exit port 62 and into the reservoir 28.

If desired, the upper portion 72 of the poppet body 74 may be formed from circular cylindrical stock and may have an outer diameter less than the diameter of the circular cylindrical surface 122 to form an annular clearance for the passage of oil or other working fluid.

When the fluid pressure drops to a level where the fluid force on the bottom of the poppet body 74 is less than the spring force on the top, the poppet body 74 is then displaced downward until sealing contact of the conical surface 101 with the fourth valve seat 104 is restored. The points 120 of the upper portion 72 provide guidance while the poppet body 74 is in motion. To protect the pump components against damage from an overpressure condition, the operator may be advised to set the relief valve at 15% over the nominal operating pressure. The sight glass 64 allows the operator to see when the pump is in a relief condition. This visual indication of relief may aid in pump diagnostics and setting of the relief valve.

A cover 130 may be threaded onto the cap 114 and an O-ring 132 may be provided for sealing purposes, if desired.

From the foregoing, it can be seen that the first through fourth sealing surface are preferably coaxial (i.e., they have a common center axis). Also, the air bleed valve is preferably disposed radially inside the purge valve and the purge valve is preferably disposed radially inside the relief valve. This arrangement of elements advantageously results in a compact overall size.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

What is claimed is:
1. A multifunction hydraulic valving apparatus, comprising:
    a relief valve;
    a gas purge valve; and
    a bleed valve;
    the relief valve, the gas purge valve and the bleed valve being disposed in a single bore.
2. The multifunction valving apparatus of claim 1, in combination with and in fluid communication with a pump.
3. The multifunction valving apparatus of claim 2, wherein the bleed valve comprises a ball disposed in a valve chamber and is movable into and out of engagement with a valve seat during suction and discharge strokes of the pump.
4. The multifunction valving apparatus of claim 1, wherein the purge valve comprises a movable valve element which is manually displaceable away from a sealing position in engagement with a valve seat.
5. The multifunction valving apparatus of claim 1, wherein the relief valve comprises a spring-loaded poppet body which is movable in response to an elevated fluid pressure condition away from a sealing surface.
6. The multifunction valving apparatus of claim 1, wherein the relief valve, the gas purge valve and the bleed valve have coaxial sealing surfaces.
7. The multifunction valving apparatus of claim 1, wherein the bleed valve is disposed within the gas purge valve.
8. The multifunction valving apparatus of claim 1, wherein the bleed valve and the gas purge valve are disposed within the relief valve.
9. The multifunction valving apparatus of claim 1, wherein the purge valve comprises a movable valve element and wherein the bleed valve includes a ball movable within a valve chamber disposed in the movable valve element.
10. The multifunction valving apparatus of claim 1, wherein the relief valve includes a spring-loaded poppet body which is movable in response to an elevated fluid pressure condition and the purge valve comprises a movable valve element disposed in the poppet body and wherein the bleed valve includes a ball movable within a valve chamber disposed in the movable valve element.
11. A multifunction hydraulic valving apparatus, comprising:
    a relief valve;
    a gas purge valve; and
    a bleed valve;
    the relief valve, the gas purge valve and the bleed valve being disposed in a single bore;
    the relief valve, the gas purge valve and the bleed valve having a common center axis and wherein the bleed valve is disposed radially inside the gas purge valve and the gas purge valve is disposed radially inside the relief valve.
12. The multifunction hydraulic valving apparatus of claim 11, wherein the bleed valve includes a ball movable within a chamber disposed within the gas purge valve.
13. The multifunction valving apparatus of claim 12, wherein the purge valve comprises a movable valve element which is manually displaceable away from a sealing position in engagement with a valve seat.
14. The multifunction valving apparatus of claim 13, wherein the relief valve comprises a spring-loaded poppet body which is movable in response to an elevated fluid pressure condition away from a sealing surface.
15. The multifunction valving apparatus of claim 13, wherein the relief valve includes a spring-loaded poppet body which is movable in response to an elevated fluid pressure condition and the purge valve comprises a movable valve element disposed in the poppet body and wherein the bleed valve includes a ball movable within a valve chamber disposed in the movable valve element.

16. The multifunction valving apparatus of claim 11, in combination with and in fluid communication with a pump.

17. Hydraulic apparatus, comprising:

a fluid pump;

multifunction valving apparatus in fluid communication with the fluid pump and disposed in a single bore in the fluid pump including a relief valve, a gas purge valve and a bleed valve;

the relief valve, the gas purge valve and the bleed valve having coaxial sealing surfaces and the bleed valve being disposed radially inside the gas purge valve and the gas purge valve being disposed radially inside the relief valve, wherein the relief valve includes a spring-loaded poppet body which is movable in response to an elevated fluid pressure condition and the gas purge valve comprises a movable valve element disposed in the poppet body and wherein the bleed valve includes a ball movable within a valve chamber disposed in the valve element.

18. The hydraulic apparatus of claim 17, wherein the gas purge valve further includes a spring biasing the valve element into engagement with a sealing surface in the poppet body and a manually displaceable actuator engageable with the valve element.

19. The hydraulic apparatus of claim 18, wherein the valve element has a hexagonal shape in cross section and is disposed in a valve recess which is circular in cross section.

20. The hydraulic apparatus of claim 19, wherein the poppet body has a hexagonal shape in cross section and is disposed in a bore which is circular in cross section.

21. The hydraulic apparatus of claim 18, wherein the valve element has a circular cylindrical shape in cross section and is disposed in a valve recess which is circular in cross section.

* * * * *